(12) United States Patent
Palti-Wasserman (10) Patent No.: US 10,884,577 B2
(45) Date of Patent: Jan. 5, 2021

(54) IDENTIFICATION OF DYNAMIC ICONS BASED ON EYE MOVEMENT

(71) Applicant: POOW INNOVATION LTD., Haifa (IL)

(72) Inventor: Daphna Palti-Wasserman, Haifa (IL)

(73) Assignee: PooW Innovation Ltd., Haifa (IL)

( * ) Notice: Subject to any disclaimer, the term of this patent is extended or adjusted under 35 U.S.C. 154(b) by 356 days.

(21) Appl. No.: 14/760,484

(22) PCT Filed: Jan. 14, 2014

(86) PCT No.: PCT/IL2014/050035
§ 371 (c)(1),
(2) Date: Jul. 13, 2015

(87) PCT Pub. No.: WO2014/111924
PCT Pub. Date: Jul. 24, 2014

(65) Prior Publication Data
US 2015/0355815 A1     Dec. 10, 2015

Related U.S. Application Data (60) Provisional application No. 61/752,495, filed on Jan. 15, 2013.

(51) Int. Cl.
*G06F 3/0481* (2013.01)
*G06F 3/0484* (2013.01)
*G06F 3/01* (2006.01)

(52) U.S. Cl.
CPC .......... *G06F 3/04817* (2013.01); *G06F 3/013* (2013.01); *G06F 3/017* (2013.01); *G06F 3/04842* (2013.01)

(58) Field of Classification Search
None
See application file for complete search history.

(56) References Cited

U.S. PATENT DOCUMENTS

| 5,204,703 A | 4/1993 | Hutchinson |
| 5,614,967 A | 3/1997 | Ishikawa |
| 6,090,051 A * | 7/2000 | Marshall ................ A61B 5/163 600/558 |
| 6,659,939 B2 * | 12/2003 | Moll ...................... A61B 34/30 600/102 |
| 7,561,143 B1 * | 7/2009 | Milekic .................. G06F 3/013 345/156 |
| 7,839,423 B2 * | 11/2010 | Ishiyama ................ G09G 5/36 345/660 |

(Continued)

FOREIGN PATENT DOCUMENTS

WO    2012174743    12/2012

*Primary Examiner* — Ryan Barrett
*Assistant Examiner* — Haimei Jiang
(74) *Attorney, Agent, or Firm* — Potomac Law Group, PLLC (57) ABSTRACT

There is provided herein a system for identifying a selected icon, the system comprising at least one controller configured to obtain from a sensor a signal indicative of an eye-response of a user, said eye-response is responsive to at least one dynamic property of a dynamic icon selected by the user by watching said selected dynamic icon, analyze said eye-response of said user, identify said selected dynamic icon based on said analysis, and produce a signal indicative of said selected dynamic icon.

19 Claims, 6 Drawing Sheets

(56) References Cited

U.S. PATENT DOCUMENTS

| | | | |
|---|---|---|---|
| 7,986,816 B1 | 7/2011 | Hoanca | |
| 8,155,479 B2* | 4/2012 | Hoffman | A61B 1/00039 382/276 |
| 8,235,529 B1* | 8/2012 | Raffle | A61B 3/113 351/209 |
| 9,007,301 B1* | 4/2015 | Raffle | G09G 3/003 345/156 |
| 9,185,352 B1* | 11/2015 | Jacques | H04N 7/18 |
| 9,285,874 B2* | 3/2016 | Bychkov | G06F 3/013 |
| 2002/0105482 A1* | 8/2002 | Lemelson | G06F 3/013 345/7 |
| 2003/0123027 A1* | 7/2003 | Amir | A61B 3/113 351/209 |
| 2005/0047629 A1* | 3/2005 | Farrell | G06F 3/013 382/117 |
| 2005/0206583 A1* | 9/2005 | Lemelson | A61B 1/00048 345/7 |
| 2006/0256083 A1 | 11/2006 | Rosenberg | |
| 2008/0104415 A1* | 5/2008 | Palti-Wasserman | G06K 9/6201 713/186 |
| 2008/0309616 A1* | 12/2008 | Massengill | A61B 3/113 345/156 |
| 2009/0163898 A1* | 6/2009 | Gertner | A61B 3/113 606/4 |
| 2009/0248036 A1* | 10/2009 | Hoffman | A61B 1/045 606/130 |
| 2010/0053555 A1* | 3/2010 | Enriquez | A61B 3/113 351/210 |
| 2010/0165093 A1* | 7/2010 | Sugio | A61B 3/113 348/78 |
| 2011/0141010 A1* | 6/2011 | Sakata | A61B 3/113 345/156 |
| 2011/0170067 A1* | 7/2011 | Sato | A61B 5/0496 351/209 |
| 2011/0254865 A1* | 10/2011 | Yee | G06F 3/013 345/661 |
| 2012/0019645 A1* | 1/2012 | Maltz | G02B 7/287 348/78 |
| 2012/0162603 A1* | 6/2012 | Dejima | A61B 3/113 351/209 |
| 2012/0223890 A1* | 9/2012 | Borovsky | G06F 3/04883 345/173 |
| 2012/0256967 A1* | 10/2012 | Baldwin | G06F 3/013 345/684 |
| 2012/0257035 A1* | 10/2012 | Larsen | G06F 3/013 348/78 |
| 2013/0042296 A1* | 2/2013 | Hastings | G06F 21/10 726/1 |
| 2013/0135196 A1 | 5/2013 | Park | |
| 2013/0234926 A1* | 9/2013 | Rauber | G06F 3/0487 345/156 |
| 2013/0265227 A1* | 10/2013 | Julian | G06F 3/04812 345/157 |
| 2013/0293488 A1* | 11/2013 | Na | G06F 3/013 345/173 |
| 2013/0307762 A1* | 11/2013 | Ashbrook | G02B 27/0093 345/156 |
| 2013/0321265 A1* | 12/2013 | Bychkov | G06F 3/013 345/156 |
| 2014/0046193 A1* | 2/2014 | Stack | A61B 3/113 600/476 |
| 2014/0125574 A1* | 5/2014 | Scavezze | G06F 21/31 345/156 |
| 2014/0154651 A1* | 6/2014 | Stack | A61B 5/16 434/236 |
| 2014/0181106 A1* | 6/2014 | Horowitz | G06F 17/30265 707/737 |
| 2014/0282196 A1* | 9/2014 | Zhao | G06F 3/013 715/771 |
| 2014/0300538 A1* | 10/2014 | Rijnders | G06F 3/013 345/156 |
| 2014/0380230 A1* | 12/2014 | Venable | G06F 3/013 715/781 |
| 2016/0011724 A1* | 1/2016 | Wheeler | G06F 3/0482 715/822 |

* cited by examiner

IDENTIFICATION OF DYNAMIC ICONS BASED ON EYE MOVEMENT

RELATED APPLICATION DATA

This application is the U.S. National Stage of International Application No. PCT/IL2014/050035 filed Jan. 14, 2014, which claims the benefit of U.S. Provisional Patent Application No. 61/752,495 filed Jan. 15, 2013. Each of the foregoing applications is hereby incorporated by reference in its entirety for all purposes.

FIELD OF DISCLOSURE

The present disclosure relates to dynamic icons used for Man-Machine Interface (MMI).

BACKGROUND

Man-Machine Interface (MMI) technologies have advanced significantly in the last decades. For example, the MMI with computers has developed from using punched cards into using a keyboard, followed by introduction of a mouse/track ball, and finally the introduction of touch screens which are being used today. The continuing development of new MMI technologies, such as recently developed use of hand gestures, is motivated by the drive to enable an interaction with machines which is more intuitive and natural for the user. Furthermore, as people work more and more hours with computers and other electronic devices, new ergonomic and orthopedic problems arise, and require a solution.

Eye-movements, however, are a complex process, which includes many different types of movements such as, but not limited to: fixation, gaze, saccades, convergence, rolling, pursuit, nystagmus, drift and micro-saccades, physiological nystagmus, blinking, pupil size, or any combination thereof. The eye movement response may include static characteristics dynamic characteristics or any combination thereof. A short review of the eye anatomy, physiology and functionality is given hereinafter. The retina of a human eye is not homogeneous. To allow for diurnal vision, the eye is divided into a large outer ring of highly light-sensitive but color-insensitive rods, and a comparatively small central region of lower light-sensitivity but color-sensitive cones, called the fovea. The outer ring provides peripheral vision, whereas all detailed observations of the surrounding world is made with the fovea, which must thus constantly be subjected to different parts of the viewed scene by successive fixations. The perception of a complex scene involves a complicated pattern of fixations, where the eye is held (fairly) still, and saccades, where the eye moves to foveate a new part of the scene. Saccades are the principal method for moving the eyes to a different part of the visual scene, and are sudden, rapid movements of the eyes. It takes about 100 ms to 300 ms to initiate a saccade, that is, from the time a stimulus is presented to the eye until the eye starts moving, and another 30 ms to 120 ms to complete the saccade. Usually, we are not conscious of this pattern; when perceiving a scene, the generation of this eye-gaze pattern is felt as an integral part of the perceiving process.

Fixation and saccades are not the only eye movement identified. Research literature, for example, there are six other different types of eye movements: (1) Convergence, a motion of both eyes relative to each other. This movement is normally the result of a moving stimulus: (2) Rolling is a rotational motion around an axis passing through the fovea-pupil axis. It is involuntary, and is influenced, among other things, by the angle of the neck; (3) Pursuit, a motion, which is a much smoother and slower than the saccade; it acts to keep a moving object foveated. It cannot be induced voluntarily, but requires a moving object in the visual field; (4) Nystagmus, is a pattern of eye movements that occur in response to the turning of the head (acceleration detected by the inner ear), or the viewing of a moving, repetitive pattern (the train window phenomenon). It consists of smooth 'pursuit' motion in one direction to follow a position in the scene, followed by a fast motion in the opposite direction to select a new position: (5) Drift and microsaccades, which are involuntary movements that occur during fixations, consist of slow drifts followed by very small saccades (microsaccades) that apparently have a drift-correcting function; and (6) Physiological nystagmus is a high-frequency oscillation of the eye (tremor) that serves to continuously shift the image on the retina, thus calling fresh retinal receptors into operation. Physiological nystagmus actually occurs during a fixation period, is involuntary and generally moves the eye less than 1°. Pupil size is another parameter, which is sometimes referred to as part of eye movement, since it is part of the vision process.

Despite efforts to develop Man-Machine Interface technologies which are based on eye contact between the user and a machine, there is still need in the art for an intuitive and efficient eye-movement dependent Man-Machine Interface.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

According to some embodiments, the present disclosure provides an innovative system and method for interacting with a machine, usually referred to as Man-Machine Interface (MMI) or Graphic User Interface (GUI) or Machine User interface (MUI).

More details and features of the current disclosure and its embodiments may be found in the description and the attached drawings.

According to some embodiments, the present disclosure provides a system for identifying a selected icon, the system includes at least one controller configured to: obtain from a sensor a signal indicative of an eye-response of a user, the eye-response is responsive to at least one dynamic property of a dynamic icon selected by the user by watching the selected dynamic icon, analyze the eye-response of the user, identify the selected dynamic icon based on the analysis, and produce a signal indicative of the selected dynamic icon.

According to some embodiments, the controller is further configured to activate at least one dynamic icon such that each of the at least one dynamic icon demonstrates at least one dynamic property.

According to some embodiments, the system configured for use as a Man Machine Interface (MMI) and wherein the signal indicative of the selected dynamic icon is configured to interface with a machine. According to some embodiments, the machine may include a computer, mobile device, television, car, plane, ship, goggle, helmet, window, billboard, display, military equipment, game, home appliance, electronic device, gadget or any combination thereof.

According to some embodiments, identifying the selected dynamic icon may include forming an identification signature for the identified selected dynamic icon. According to some embodiments, identifying the selected dynamic icon may further include comparing the identification signature to a database including at least one pre-stored unique identification signatures of dynamic icons. According to some embodiments, the identification signature may be binary coded.

According to some embodiments, the system may include at least two dynamic icons, wherein each one of the at least two dynamic icon's is designed to form a different identification signature. According to some embodiments, the dynamic icon may be designed to enable detection of the dynamic icon from the user's eye-response.

According to some embodiments, the at least one dynamic property of the dynamic icon may include a dynamic visual characteristic. According to some embodiments, the dynamic visual characteristic may include dynamic position, color, brightness, size, shape, frequency, velocity, acceleration, pattern, trajectory or any combination thereof.

According to some embodiments, the eye-response may include eye-movement trajectory, eye-movement direction, eye-movement frequency, pupil activity, pupil size, blinking speed, blinking frequency, gaze, saccades, drift, fixation, nystagmus, convergence, rolling, smooth pursuit, or any combination thereof.

According to some embodiments, the at least one dynamic icon may be one dimensional, two dimensional, three dimensional dynamic icon or any combination thereof. According to some embodiments, the at least one dynamic icon is a three dimensional object, a one dimensional dynamic icon placed on a three dimensional object, a two dimensional dynamic icon placed on a three dimensional object or any combination thereof.

According to some embodiments, the at least one dynamic icon is activated independent of the at least one controller.

According to some embodiments, the system may further include a sensor configured to acquire the user's eye-response. The sensor may include a black and white camera, a color camera, an infra-red sensitive camera, a three dimensional camera or any combination thereof. The sensor may include a CCD, CMOS, ERG apparatus, Ober detection apparatus, coil eye detection apparatus, photodiode set-up or a combination thereof.

According to some embodiments, the signal obtained from a sensor may include a temporal signal. According to some embodiments, the analysis of the obtained temporal signal may include analysis in the frequency domain According to some embodiments, the analysis of the obtained temporal signal may include image processing to calculate the location of the user's eyes, creating a temporal eye-response signal of the user, and analysis of the temporal eye-response signal to obtain the identity of the selected dynamic icon.

According to some embodiments, the system may further include a display unit configured to display the at least one dynamic icon. According to some embodiments, the system may further include an additional MMI module(s). The additional MMI module may be based on gesture, face, voice, keyboard, mouse, trackball, touch or any combination thereof.

According to some embodiments, the sensor, the at least one controller and the dynamic icons are all embedded in a mobile device, such as but not limited to, a Smartphone.

According to some embodiments, the present disclosure provides a method for identifying a dynamic icon selected by a user's eyes, the method includes: obtain, from a sensor, a signal indicative of an eye-response of a user, the eye-response is responsive to at least one dynamic property of a dynamic icon selected by the user by watching the selected dynamic icon, analyzing, via the controller, the eye-response of the user, identifying, via the controller, the selected dynamic icon based on the analysis, and producing a signal indicative of the selected dynamic icon. According to some embodiments, the method may further include activating at least one dynamic icon such that each of the at least one dynamic icon demonstrates at least one dynamic property.

According to some embodiments, the method is configured for use as a Man Machine Interface (MMI) and wherein the signal indicative of the selected dynamic icon is configured to interface with a machine.

According to some embodiments, identifying the selected dynamic icon may include forming an identification signature for the identified selected dynamic icon. According to some embodiments, identifying the selected dynamic icon may further include comparing the identification signature to a database including at least one pre-stored unique identification signatures of dynamic icons. According to some embodiments, the identification signature may be binary coded.

According to some embodiments, the method further includes designing at least two dynamic icons, wherein each of the at least two dynamic icons is designed to form a different identification signatures. According to some embodiments, the at least one dynamic icon may be designed to enable detecting of the dynamic icon from the user's eye-response.

According to some embodiments, the at least one dynamic property of the at least one dynamic icon may include a dynamic visual characteristic. The dynamic visual characteristic may include dynamic position, color, brightness, size, shape, frequency, velocity, acceleration, pattern, trajectory or any combination thereof.

According to some embodiments, the eye-response may include eye-movement trajectory, eye-movement direction, eye-movement frequency, pupil activity, pupil size, blinking speed, blinking frequency, gaze, saccades, drift, fixation, nystagmus, convergence, rolling, smooth pursuit, or any combination thereof.

According to some embodiments, the at least one dynamic icon may be one dimensional, two dimensional, three dimensional dynamic icon or any combination thereof. According to some embodiments, the at least one dynamic icon may be a three dimensional object, a one dimensional dynamic icon placed on a three dimensional object, a two dimensional dynamic icon placed on a three dimensional object or any combination thereof. According to some embodiments, activating the at least one dynamic icon may be done independent of the controller.

According to some embodiments, the signal obtained from a sensor may include a temporal signal. According to some embodiments, the analyzing the obtained temporal signal may include analysis in the frequency domain. According to some embodiments, analyzing the obtained temporal signal may include image processing to calculate the location of the user's eyes, creating a temporal eye-response signal of the user, and analysis of the temporal eye-response signal to obtain the identity of the selected dynamic icon.

According to some embodiments, the method may further include displaying the at least one dynamic icon via a display unit. According to some embodiments, the method may further include acquiring the user's eye-response via the sensor. According to some embodiments, the method may further include using an additional MMI module based on gesture, face, voice, keyboard, mouse, trackball, touch or any combination thereof. According to some embodiments, the sensor, the at least one controller and the at least one dynamic icons are all embedded in a mobile device.

According to some embodiments, there is provided herein a Man Machine Interface (MMI) system, the system includes: at least one dynamic icon configured to include at least one dynamic property; at least one sensor, adapted to acquire the dynamic icon's temporal signal directly from the dynamic icon, or indirectly by acquiring at least one temporal eye-response of a user, from at least one of the user's eyes, wherein the user has selected a dynamic icon, and is watching the selected dynamic icon. According to some embodiments, the system further includes a controller configured to obtain the dynamic icon's temporal signal from the sensor, perform an analysis of the acquired temporal signal, identify the selected dynamic icon based on the analysis, and produce an interface signal indicative of the selected dynamic icon, wherein the signal is configured to interface with a machine. According to some embodiments, the system further includes a display configured to display the dynamic icon.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the present disclosure, suitable methods and materials are described below. In case of conflict, the patent specification, including definitions, will control. In addition, the materials, methods, and examples are illustrative only and not intended to be limiting.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. It is intended that the embodiments and figures disclosed herein are to be considered illustrative rather than restrictive. The figures are listed below:

FIGS. 3 a-c schematically illustrate examples of three different ways to deploy dynamics Icons according to some embodiments of the disclosure;

FIG. 6b illustrates the corresponding response eye movement of a user watching the dynamic Icons of FIG. 6a.

While specific embodiments were described, this was done as means for helping to clarify, how the invention works. The detailed embodiments are merely examples of the disclosed system and method. This does not imply any limitation on the scope of the disclosed invention. Applicant acknowledges that many other embodiments are possible.

DETAILED DESCRIPTION

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions and sub-combinations as are within their true spirit and scope.

In the description and claims of the application, each of the words "comprise" "include" and "have", and forms thereof, are not necessarily limited to members in a list with which the words may be associated.

According to some embodiments, there is provided herein a Man-Machine Interface (MMI) between a user and a machine, which allows the user to select a desired function from the machine by selecting an icon "hands free", using his eyes, where the MMI does not need to calculate where the user is looking to i.e. the location (coordinates) of his eye's gaze and does not require knowing the selected icon's physical location. According to some embodiments, the MMI further allows the user to activate "hands free" a task using his eyes.

The MMI, according to embodiments of the disclosure, may be used for interacting with any machine (for example, but not limited to smartphones, laptops, tablets, games, remote controls, TVs and other machines). Among other things the MMI, according to embodiments of the disclosure, intuitive, hands-free, contactless, does not require a special interface unit (such as a mouse, keyboard etc.), low-cost and enables working at a distance from the machine. The disclosed MMI can be deployed, according to some embodiments, as a standalone MMI or, according to additional or alternative embodiments, together with other MMI technologies such as keyboard, mouse, voice and/or touch gesture or any other element, technology or a combination thereof.

Figure 1:
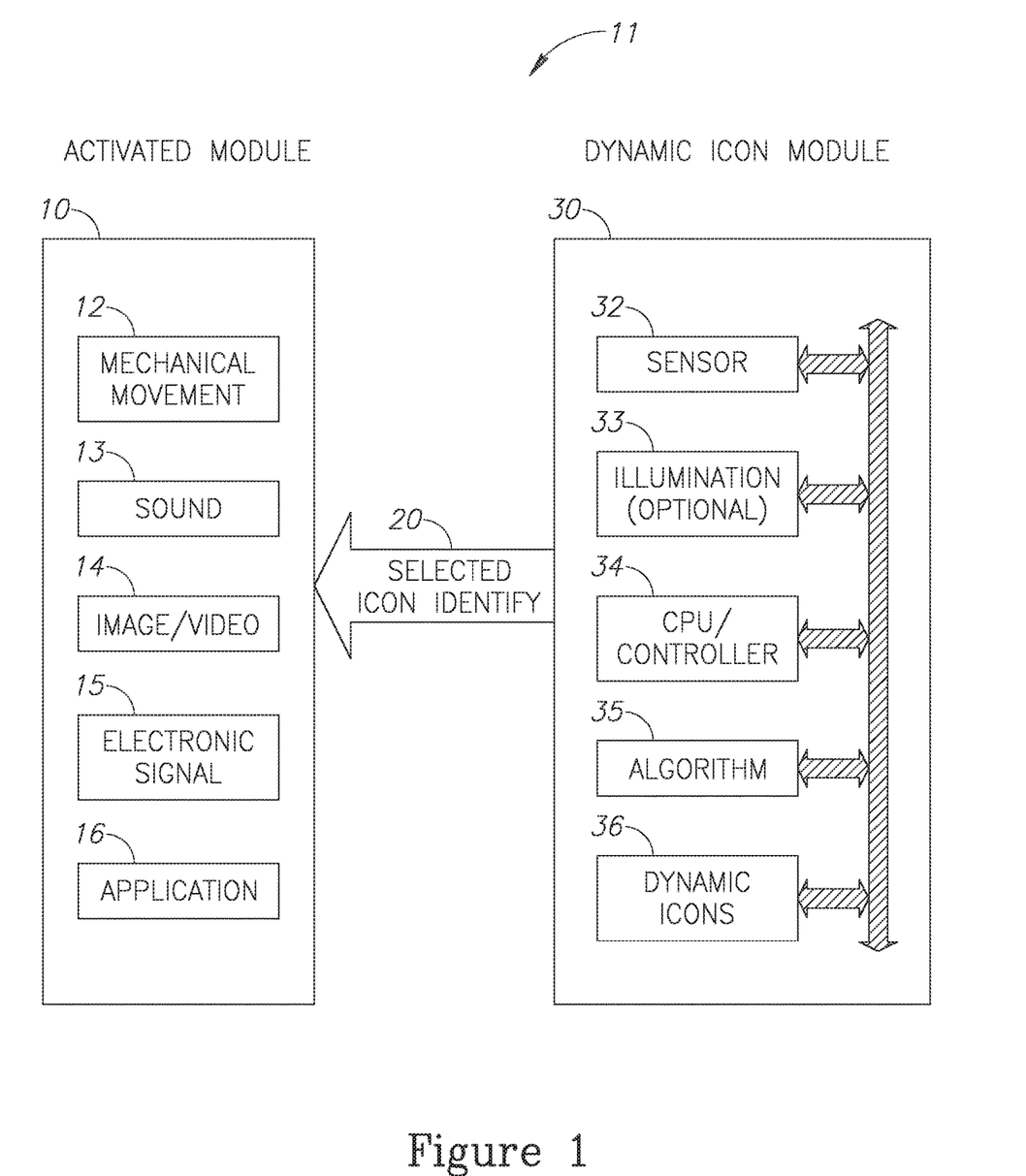
FIG. 1 schematically describes a Man-Machine Interface (MMI), according to some embodiments of the disclosure.

Reference is now made to FIG. 1, which schematically describes a Man-Machine Interface (MMI), according to some embodiments of the disclosure. Dynamic Icon MMI (11) includes a Dynamic Icon Modules (30) configured to detect, a selected Dynamic Icons identity (20) and an activated module (10). Dynamic Icon module (30) includes at least one "Dynamic Icon(s)" (DI) (36), a sensor (32) configured to acquire a user's eye movements, illumination (optional) (33), algorithms (35) designed to analyze the acquired eye movements and a processing unit/controller (CPU) (34) configured to operate and synchronize some or all of the components (sensor (32), illumination (33), Dynamic Icons (36), and algorithm (35)). In operation, a user selects a Dynamic Icon (36) by merely watching it; Sensor (32) acquires the user's eye movement; controller (34) calculates the selected Dynamic Icons identity (20); and, based on the selected Dynamic Icons identity (20) processing unit/controller (34), activates module (10). Module (10) may include for example, mechanical movement (12), sound (13), image/video (14), electronic signal (15), (software) application (16) and/or any other module. According to some embodiments, there is no need to calibrate the disclosed MMI. It is understood that other modules are covered under the scope of this disclosure, according to the specific application required from the system According to some embodiments, the detection of the user's selection of a specific Dynamic Icon is based on the analysis of his/her eye movements, as he/she is watching the selected icon. Identifying the selected Dynamic Icon is based on the fact that each of the icons, such as Dynamic Icons (DI) (36) has unique dynamics. The unique icon's dynamics is transformed into a unique eye-movement dynamics. Accordingly each Dynamic Icon will be represented by a typical and unique eye-movement of the user. By analyzing and identifying the user's eye-movement the selected Dynamic Icon, such as selected Dynamic Icons identity (20), can be detected. The selected Dynamic Icon may then, according to some embodiments, form an interface signal and activate any type of task or a function.

Figure 2:
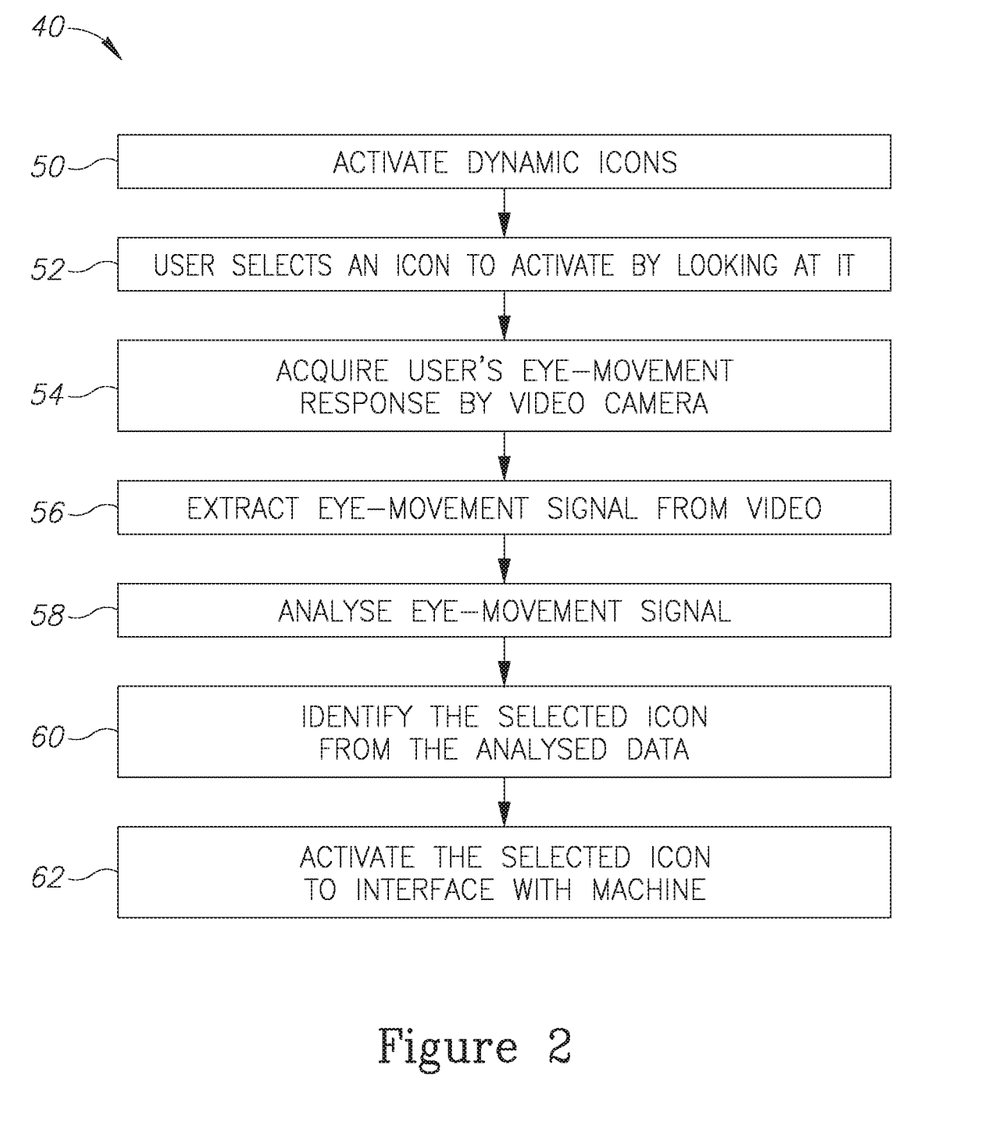
FIG. 2 schematically illustrates a process of using a Dynamic Icon MMI, according to some embodiments of the disclosure.

Reference is now made to FIG. 2, which schematically illustrates a process of using Dynamic Icon MMI (40), according to some embodiments of the disclosure. According to some embodiments, Dynamic Icon MMI (40) process is based on selection of a DI with the user's eyes. According to some embodiments, the displayed Dynamic Icon does not have to be active all the time, thus the process may begin by activating the Dynamic Icons, if required (50). Accordingly, once activated, each Dynamic Icon will display its unique dynamic property/characteristic (for example, rotation, vibration, movement along x and/or y axis, acceleration, velocity, flickering or any other dynamic property). The user interacts with the machine is by selecting a specific Dynamic Icon, and watching it (52). A sensor acquires the user's eye-movements (54), as he/she is watching the Dynamic Icon. The sensor can acquire the image of one or two eyes. The user's eye-movement response reflects the dynamics of the specific Dynamic Icon he/she has selected and is watching. The eye-movement activity may be acquired by any available eye-tracking method (ERG, optic sensor, Ober system, coil technologies). According to some embodiments, the eye-movements are acquired using any type of video camera. Examples of possible camera include, but are not limited to: black and white, color and infrared sensitive cameras. The sensor unit, may include a single camera multiple cameras, or be any type of three dimensional (3D) camera. However, other types of camera may be used. Controlled illumination may be added to enhance the images. The light could be in any frequency including the visual spectrum and the near IR spectrum. For example, near IR illumination, if used, enhances the image contrast and quality. The acquired eye-movement images are then processed and an eye-movement temporal signal is extracted by a processing unit (56). This may be done, for example, by finding the location of the eyes, using the location of pupils, and/or irises in each video frame. According to some embodiments, this acquired signal represents the eyes movement pattern in time. Head movements may be subtracted if necessary. The eye-movement signal may include many types of information, which can be used to detect the user's selected Dynamic Icon. A processing unit analyses the eye-movement temporal signal (58), and extracts the required information. The extracted information includes, but is not limited to: trajectories, direction information (X, Y), typical frequencies, pupil activity (dialation), blinking, head movements, saccades, Convergence, Rolling Pursuit, Nystagmus, Drift, Microsaccades, and Physiological Nystagmus. Using the extracted information, any combination thereof or any coding based on this information the user's selected Icon is identified (60). Once the selected Dynamic Icon was detected the MMI may now activate the selected Dynamic Icon (62) usually by activating its corresponding task or function. The selected Dynamic Icon can be programmed to activate various processes such as, but not limited to: Select a program (Microsoft office, internet explorer, weather report, You Tube), select a function (answer phone, enter a menu, enter contacts, on/off, calendar, start car, radio station), select an item (phone number, movie, contact), OK/cancel previous selection, move cursor, scroll, and tune up-down (volume, temperature).

Standard eye-tracking technologies analyze where the user is looking to (the X,Y,Z location of his eyes). Thus their performance relies significantly on the accuracy and robustness of the eye-movement signal and analysis. Furthermore, they require repeatable calibration. One advantage of the disclosed eye based MMI is that unlike standard tracking technologies, the system does not need calibration at all. This is since the Dynamic Icon MMI does not track and analyze where the user is looking to, instead it analyzes the dynamics of the user's eye-movements, which are correlated to a specific Dynamic Icon. The disclosed MMI analyzes what the user is looking at, rather than where he is looking to. This unique approach enhances the performance (accuracy and robustness) of the Dynamic Icon MMI, since the system does not rely on the accuracy and the robustness of the user's eye-movement signal, thus the Signal to Noise ratio of the eye-movement signal and is improved significantly, resulting in improved performance of the MMI.

According to some embodiments, a "Dynamic Icon" can include or be based on standard graphic icons as used today in many software applications. The Dynamic Icons may also include any other types of visual or graphic symbol, including, but not limited to: images, photos, numbers, letters, arrows, lines, colors, intensities, lights, dots and shapes. However, according to some embodiments, each Dynamic Icon includes some unique dynamic quality/characteristic/property(s), which will distinguish it from the other icons and may serve as its unique signature. Such icons are referred to herein as "Dynamic Icons" (DI). The terms "Dynamic Icon(s)" and dynamic icon(s) can be interchangeably used. According to some embodiments, different DIs may be graphically identical, similar or different from each other, but each of them includes one or more unique dynamic quality/characteristic.

According to some embodiments, a dynamic property/characteristic may include any property/characteristic that changes in time. For example, but not limited to, rotation, vibration, movement along x and/or y axis, acceleration, velocity, flickering or any other dynamic property or combination thereof.

Figure 3A:
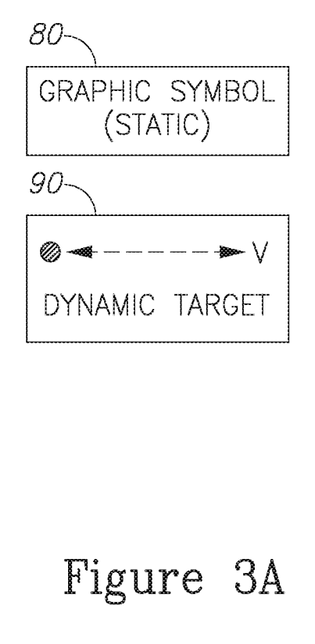
Figure 3B:
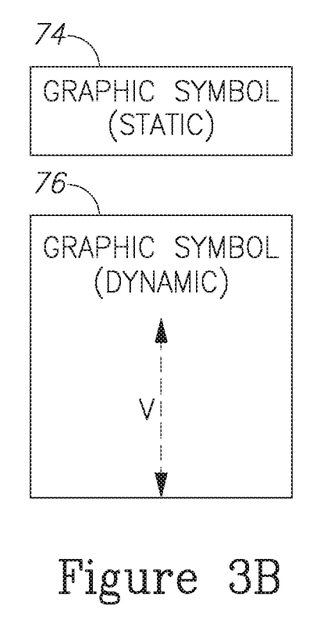
Figure 3C:
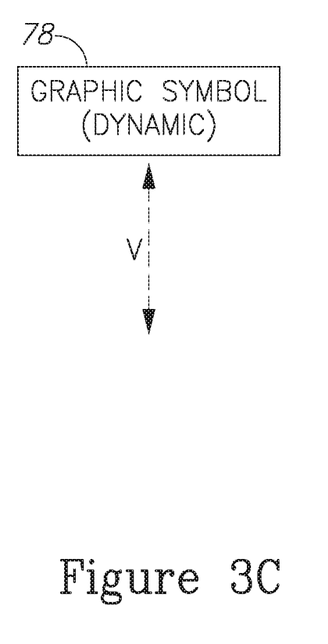

There are different ways to deploy the dynamic quality/characteristic(s) in a DI. FIG. 3 (*a-c*) schematically illustrate examples of three different ways to deploy dynamics in Dynamic Icons, according to some embodiments of the disclosure. In some embodiments, (FIG. 3*c*), the entire DI may be dynamic. For example a DI for selecting a software application may include a dynamic graphic symbol (78) related to a required application, where the entire DI is configured to move in a unique pattern and velocity (v). An alternative embodiment is illustrated in FIG. 3*b*. This embodiment depicts, a static graphic symbol (74), and a dynamics associated to the Dynamic Icon, is deployed in a separate element, an additional dynamic graphic symbol (76), which may be adjacent to static graphic symbol (74), and is configured to move and to be the dynamic part of the Dynamic Icon. For example, if a user wants to select the Google application by selecting its dynamic icon, either the entire Google icon will be dynamic, or an extension next to the Google graphic icon will include its unique dynamics.

Another possible embodiment is illustrated in FIG. 3a. This embodiment includes a static graphic symbol (80), and the dynamics of the Dynamic Icon is deployed by adding a moving (dynamic) target (90), which is located near static graphic symbol (80).

Figure 4A:
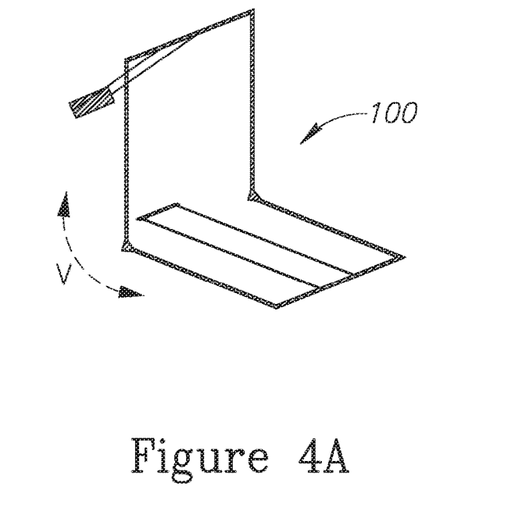
FIGS. 4a-b schematically illustrate two examples of complex dynamic Icons according to some embodiments of the disclosure.
Figure 4B:
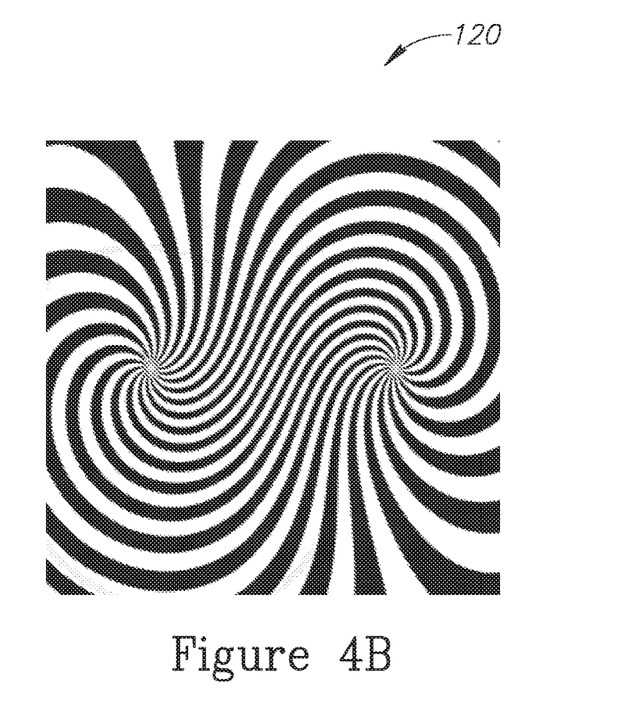

In some embodiments, the DI may include simple visual symbol(s), complex scene(s), may not include any visual symbol at all, or any combination of the above. An example of a complex DI is an icon showing a beach scene with the movement embedded in the motion of the waves reaching the shore. Reference is now made to FIGS. 4a-b, which schematically illustrate two examples of complex Dynamic Icons according to some embodiments of the disclosure.

FIG. 4a discloses a swing (100), which is the DI. Swing (100) moves (swings) back and forth at velocity v, thus creating a unique and dynamic pattern, accordingly, enabling the system to identify when the user is watching the swing, i.e. identifying the Dynamic Icon the user has selected by watching it.

Other embodiments of complex DIs may even include abstract images. FIG. 4b shows an example of abstract dynamic images, in a form of a snapshot of kinetic art work (120). The dynamics embedded in kinetic art work (120) creates a unique and dynamic pattern, thus, enabling the system to identify when the user is watching this specific image i.e. identifying the icon the user has selected by just by watching it.

Other examples of a simple DI could be a target moving in a predefined pattern or trajectory or flashing in predefined sequence. In some embodiments, the visuals of the DI are related to the activated task. In other embodiments there may be no visual or comprehensive correlation between the activated task and the DI.

In some embodiments, all the DIs are presented to the user simultaneously, in other embodiments, only part of the DIs are presented at a given moment, and the DI display changes with time.

In some embodiments, the entire DI is confined to a one dimensional, 2D (2 dimensional) plain, while in other embodiments the DI is a 3D (three dimensions) entity. For example, a 2D embodiment can be deployed by displaying DIs on any kind of display such as, but not limited to: a monitor, TV, tablet, game, watch, a laptop, a cell-phone etc. The display can be of any technology and any size.

An example for a 3D embodiment may include static visual icons on a display, which can be for example a monitor or a card, in conjunction with a dynamic unit. An example of such a dynamic unit is an apparatus which includes at least one light means. Thus in this embodiment, the dynamic pattern representing the static icon, would be a predefined pattern of moving or flashing light/lights. In some embodiments, the dynamic light unit may include any type of LEDs and any type of controller.

In other 3D DI embodiments, the static visual icon may be an item/product, and the dynamics are embedded in an additional unit positions near the item. Examples include, but are not limited to: a flashing light unit, as described above, weather vanes and pinwheels, which can be activated by air, wind or any external power source. Any apparatus or item which can provide dynamics will be suitable for this unit.

Figure 5:
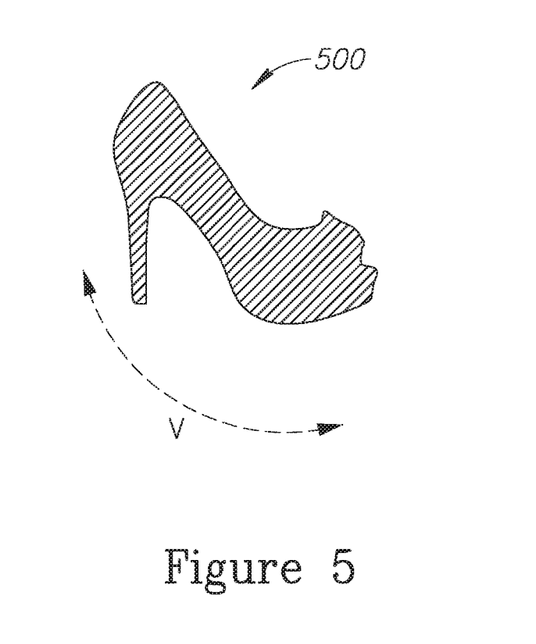
FIG. 5 Illustrates an example of a three dimensional item (shoe) used as a Dynamic Icon by moving it at a velocity v.

In yet another embodiment, the item itself may move/turn and create its own unique dynamic signature, creating a 3D DI. FIG. 5 is an example of a three dimensional item (in this case, a shoe) used as a Dynamic Icon by moving it at a velocity v. In this embodiment, a shoe (500) rotates or moves at velocity v, creating its own unique signature, thus being its own DI. Yet in other embodiments, the item itself moves or turns, but its unique dynamics is embedded by a special pattern, which is located on the moving/rotating item itself.

In another embodiment, the DI is composed of "special 3D cards", which display a visual image that moves when the card is moved (HumanEyes is an example of a company manufacturing such cards).

In accordance with some embodiments, to enable activating a specific Dynamic Icon, which the user has selected, the innovative MMI relies on the unique dynamic information embedded in each Dynamic Icon. In some embodiments, the DI selection is made using the user's eyes, as the DI dynamics is reflected in the user's eye-movement response to the DI. In other embodiments, the DI movement may be directly acquired by a sensor such as a video camera. An example of working with this approach would include a mobile device with a camera (Smartphone, tablet, laptop) and a DI application downloaded on the mobile device. In this embodiment the user will acquire the DI dynamics with his mobiles camera, the application will analyze the DI dynamics, the selected DI will be acknowledged, and an application will be activated, or alternatively the required information will be displayed on the mobile, accordingly. These types of embodiments could be deployed in marketing, shop window, selves, and billboards applications.

In accordance with some embodiments, there are various ways to create Dynamic Icon. In accordance with one embodiment, each icon changes its brightness in a different pattern. The brightness changes result in changes in the user's pupil diameter. Thus the user's eye-movements and/or pupil dynamics are correlated to the brightness dynamics of the specific Icon he has selected and is watching. Accordingly the selected Dynamic Icon can be detected by analyzing the user's eye-movements/pupil dynamics, as he responds to his selected Icon. For example, the disclosed MMI may include four (4) Dynamic Icons. The first Dynamic Icon will not change its brightness; the second will change its brightness gradually from bright to dark; the third will change its brightness gradually from dark to bright; and the forth dynamic Icon will alternate between bright and dark. By acquiring and analyzing the user's eye-movements, and more specifically by analyzing his pupil dynamic, one can conclude which Icon was selected and watched by the user. Accordingly the correct Icon can be activated, and the MMI is executed using only the user's eyes.

In accordance with another embodiment, each Dynamic Icon moves on the display in a different and unique way. The user watches the movement of his selected Dynamic Icon. By analyzing the user's eye-movements, which are following the selected Dynamic Icon's movement the MMI can detect, which DI was selected by the user. There are many unique trajectories that an DI could move on a display. Examples of possible movements includes, but are not limited to: small and local trajectory movements, big trajectory movements even on the entire display, trajectory movements only in one axis (X, or Y), trajectory movements in combined directions in specific paths, small and local jump movements, jump movements on the entire display, jump movements only in one axis (X, or Y), jumps movements in combined directions, movements of different durations/frequency, or any combination thereof.

Figure 6A:
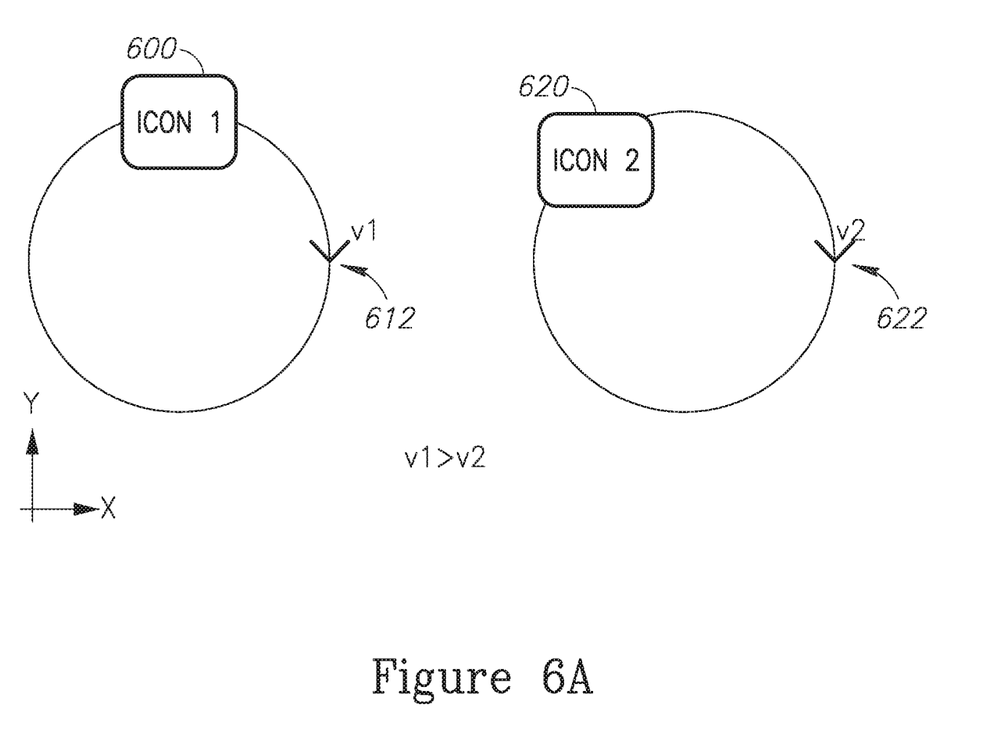
FIG. 6a Illustrates two dynamic Icons with similar trajectories and different velocities.
Figure 6B:
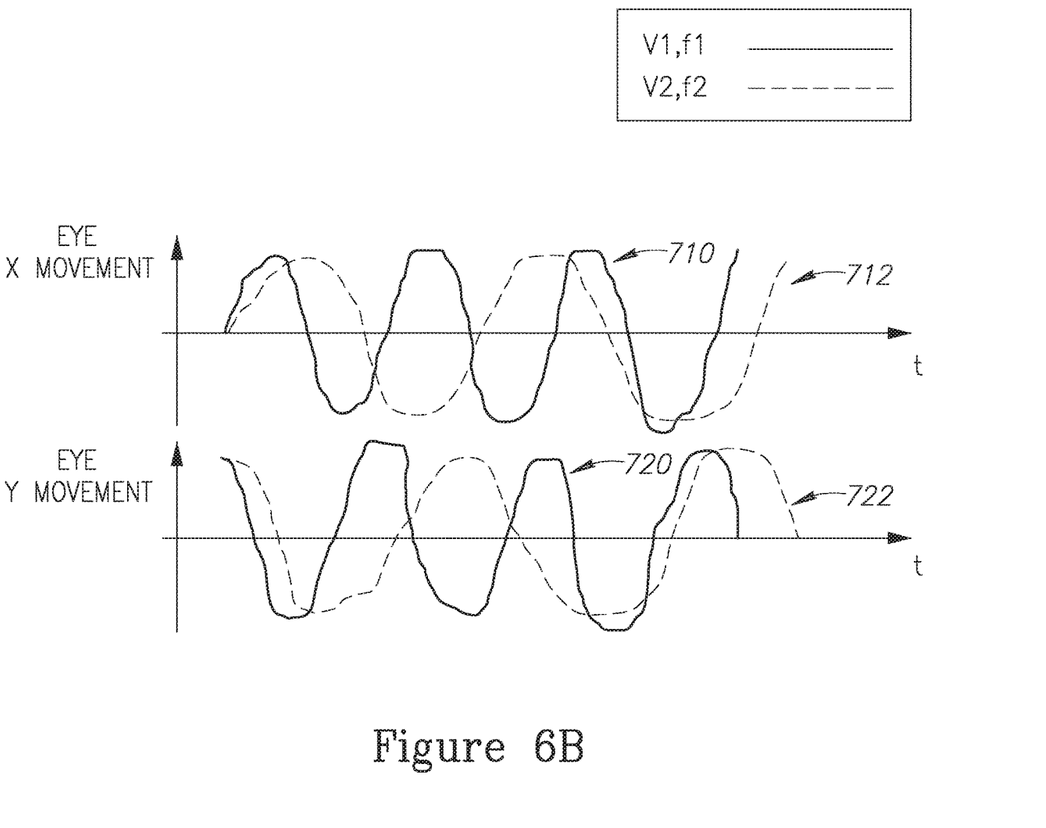

FIGS. 6a-b Illustrate two Dynamic Icons and their corresponding eye-response. FIG. 6a shows two Dynamic Icons: a first DI, Icon 1 (600), which moves continuously in a circular trajectory (612) at velocity v1, and a second DI, Icon 2 (620), which moves continuously in a circular trajectory (622) at a different velocity v2. In this embodiment, v1>v2. Accordingly, each of the Dynamic Icons has its own unique dynamic signature.

FIG. 6b shows the corresponding response eye movement of a user watching the Dynamic Icons of FIG. 6a. The eye signals are obtained, as disclosed previously, by acquiring the user's eye movements by a sensor, and analyzing the sensor output to obtain a temporal signal of the eye's position {X,Y}. In the current example, where the Dynamic Icons move in a circular trajectory, the eye-movement response signals would also be in the shape of a circular trajectory, but it would be a noisy and distorted circular trajectory.

FIG. 6b shows the corresponding circular response eye-movement signal in the {x} and {y} directions separately as a function of time. The eye-movement signals, when presented in this way, are noisy and distorted sinus signals. The eye-movement responses to Dynamic Icon 1 (600), of FIG. 6a are a noisy sinus signal in the x direction (710) at velocity v1 and a noisy sinus signal in the y direction (720) at velocity v2 The eye-movement responses to Dynamic Icon 2 of FIG. 6a are a noisy sinus signal in the x direction (712) at velocity v2 and a noisy sinus signal in the y direction (722) at velocity v2.

In one embodiment, when using an MMI based on the two Dynamic Icons of FIG. 6a, one can determine, which Dynamic Icon the user is looking at, by performing a frequency analysis on the response eye-movement signals (710, 712, 720, 722). More specifically, if the user has selected Dynamic Icon 1 (FIG. 6a, 600) which is moving at circular trajectory (612) at velocity v1, by performing a frequency analysis, such as FFT (Fast Furrier Transform), on the user's response eye-movement signal (FIG. 6b, 710, 720), one can obtain a single parameter P1, which represent the frequency of the eye-response. P1, which represents the frequency of the eye response, should be very close to the velocity v1 of Dynamic Icon 1. Alternatively, if the user has selected and is watching Dynamic Icon 2 that is moving at velocity v2, by performing a frequency analysis on the user's response eye-movement signal (FIG. 6b, 712, 722), one can obtain a single parameter P2, which represents the frequency of the eye-response that should be very close to the velocity v2 of Dynamic Icon 2. Furthermore, in accordance with some embodiment, each DI may jump/move in a specific frequency or frequencies. Accordingly the user's eye-movements as he watches the Dynamic Icon include elements of the typical frequency of the Dynamic Icon. The eye-movement analysis detects the frequency of the eye-movement, which serves as the Dynamic Icon identifier. As disclosed before the frequency information can be combined with other dynamic information. Examples of possible frequency oriented Dynamic Icon movements includes, but are not limited to: jumps in frequency f1 in the X direction, jumps in frequency f1 in the y direction, jumps in frequency f2 in the X direction, jumps in frequency f2 in the y direction, jumps in frequency f2 in the X and Y direction, jumps in frequency f2 in the X combined with trajectory movements.

While the trajectory movements of the Dynamic Icon, evoke mainly a typical smooth pursuit movement of the eyes, the jump movements of the Dynamic Icon, evoke typically saccade movements of the eye. This variety of eye-movement responses to different type of Dynamic Icon movements, contributes to the ability of creating a significant repertoire of dynamic icons, which can be identified by the disclosed innovative MMI.

Table 1 herein below, shows non-limiting examples of typical eye-responses to various icon dynamics.

TABLE 1

Typical eye response to icon dynamics

| ID | Icon Dynamics | Eye response Significant dynamics |
|----|---------------|-----------------------------------|
| 1 | circular trajectory | smooth pursuit |
| 2 | trajectory in X direction | smooth pursuit |
| 3 | trajectory in y direction | smooth pursuit |
| 4 | jumps in X direction | saccades |
| 5 | jumps in y direction | saccades |
| 6 | increase brightness | pupil dynamic |
| 7 | decrease brightness | pupil dynamics |
| 8 | trajectory + jumps pattern A | smooth pursuit + saccades |
| 9 | trajectory + jumps pattern B | smooth pursuit + saccades |

In another embodiment of the disclosed MMI, each Dynamic Icon moves in a predefined sequence, which encodes the Dynamic Icon's unique identification. This code is reflected within and extracted from the eye-movement response of the user, and is then decoded to point-out the specific Dynamic Icon the user selected.

For example, one can encode a unique signature for each DI in the binary format. In this case, each DI uses a sequence of movements, comprising of only 2 types of movements (binary building blocks). In binary coding a sequence of 8 movements may encode 256 different unique identification signatures, thus enabling to select from 256 Dynamic Icons. Examples of possible binary building blocks include, but are not limited to: Icon Jumps in X direction & Icon jumps in the Y direction; Icon jumps and halts for t milliseconds & Icon jumps and halts for 2*t milliseconds; Icon moves fast & Icon moves slow; Icon moves left & Icon moves right, Icon moves up and Icon moves down. One advantage of using a binary identification code for the different Dynamic Icons is the option of adding an additional bit, for CRC or any other error correction technique. Another advantage, of using a binary Dynamic Icon, is the option of smart selection of the binary sequences. For example, if a certain MMI requires using 20 Dynamic Icons and is using an 8 bit binary dynamic code, the MMI needs to use only 20/256 possible binary codes. A smart selection of the 20 binary codes would include selecting binary signatures which are as different-far apart as possible from each other. This will minimize errors of false identification of a Dynamic Icon. For example a Dynamic Icon encoded as {1,1,1,1,1,1,1,1} is as far as possible from a Dynamic Icon encoded as {0,0,0,0,0,0,0,0}, and the chances of confusing the two DIs is minimized. The smart selection of the Dynamic Icon's signature applies to Dynamic icons in general, and not only to the binary example. For example, a Dynamic Icon moving only in the X direction and another moving only in the Y direction are better identified than 2 Dynamic Icons moving in different trajectories in the same axis.

When designing DI, one most consider many factors some related to eye physiology limitations, and other to GUI and market requirements. In some embodiments, the user's eyes need to follow the DI, and distinguish between the different dynamic properties of the different DIs, thus, for example, the DI needs to be sufficiently big so the eye will see it, and its movement needs to be at a velocity the eye can follow. Other constraints on the DIs can be derived from the market and application. For example the dynamics of the DI must not be irritating to the user or he/she will not use the application. The DI and its movement should fit the hardware constraints used in a specific application and market. These factors may include considerations such as, but not limited to: DI size, DI speed of movement, DI complexity, DI location within an application, performance, cost, likeability to user, esthetics, acceptance within specific application/market and specific market requirements.

According to some embodiments, the Dynamic Icon based MMI disclosed herein can be used (deployed) in various markets: governmental, military, regulated industries (banks, hospitals, insurance etc.), private industries and consumer. the Dynamic Icon based MMI disclosed herein can be deployed as a standalone MMI or as part of a more complex interface which includes additional MMI such as keyboard, mouse, voice, touch gesture etc. the Dynamic Icon based MMI disclosed herein can be deployed in many platforms including but not limited to: special Goggles, helmets, windows, displays and other interfaces which are part of military equipment, part of an industrial interface or part of a consumer application.

For example, the Dynamic Icons can be integrated in the Google Goggles or any other similar technology.

In addition the Dynamic Icons, according to some embodiments, can be integrated in many software applications, using a mobile device (iPods/music players, iPads/tablets, laptops, cell-phones), PC, TV or electronic games. For example, a generic DI application will provide the ability to couple selected icons of a specific software application, with a DI. For example, in the case of Adobe Photoshop, a user may select a group of icons he/she is currently using the most and couple them to corresponding DIs. Thus now, the user will be able to activate his selected/favorite icons just by looking at them, without lifting his hand from the mouse. This will make his work easier, faster and more comfortable. The user may change the DI coupling within Photoshop application, according to his specific requirements at a specific time. In the same way, Word users mostly reading, may couple the page-up page-down or scroll icons to DIs, again making the process of reading easier and more comfortable.

Another application may include deploying the Dynamic Icons in a future car interfaces. For example, GM is developing new technologies such as the "Head-up systems", where information is embedded in the windows of the vehicle. The Dynamic Icons can be part of this system, enabling the driver an interface with his eye, without taking his hands of the steering wheel. This MMI will provide enhanced convenience and safety to the driver. In addition, Dynamic Icons can be integrated in any device using augmented reality technologies.

Many appliances and electronic devices can benefit from Integration of the Dynamic Icons in to their MMI control. Examples include, but are not limited to, controls for: smart lighting, TV remote-control, set-up box, adjustable bed, smart refrigerator, air-conditioning, microwave, oven, food-processor, blender, stereo and alarms. Other applications may include embedding the DI in games, toys, electronic games, Software applications and other gadgets. For example one could replace the hand touch in the Simon game with a glance at the corresponding color icon (DI in this case). Other examples include DI dice, DI spinners and DI game cards. The DI can also be embedded as part of a board game, in dolls robots and cars.

What we claim is:

1. A system for identifying a selected icon, the system comprising:
    a display unit configured to display a dynamic icon having a dynamic property, said dynamic property changing in a unique and continuous time pattern configured to induce horizontal and/or vertical eye movement of a user when looking at said dynamic icon;
    a sensor configured to acquire the horizontal and/or vertical eye movement of the user; and
    a controller configured to:
        extract from the acquired eye-movement a temporal signal indicative of the user's horizontal and/or vertical eye movement;
        analyze said temporal signal for an indication that the user's horizontal and/or vertical eye movement is changing correspondingly to the changes in the unique and continuous time pattern of said dynamic icon, without calculating the location coordinates of the user's eye's gaze; and
        identify said dynamic icon as selected by the user, if the analysis recognizes that the user's eye horizontal and/or vertical movement is changing correspondingly to the changes in the unique and continuous time pattern of said dynamic icon.

2. The system of claim 1, wherein said controller is further configured to activate said dynamic icon, thereby activating the dynamic property of the dynamic icon.

3. The system of claim 1, wherein said dynamic icon is configured to be activated independently of said controller.

4. The system of claim 1, wherein said identifying of said dynamic icon as selected comprises forming an identification signature for said dynamic icon and comparing said identification signature to a database comprising at least one pre-stored unique identification signatures of dynamic icons.

5. The system of claim 4, wherein said identification signature is binary coded.

6. The system of claim 1, comprising at least two dynamic icons, wherein each one of said at least two dynamic icons has a distinct dynamic property.

7. The system of claim 1, wherein the dynamic property of said dynamic icon comprises a dynamic visual characteristic comprising dynamic position, color, brightness, size, shape, frequency, velocity, acceleration, pattern, trajectory and/or any combination thereof.

8. The system of claim 1, wherein said at least one dynamic icon is a one dimensional dynamic icon, a two dimensional dynamic icon, a three dimensional dynamic icon, a one dimensional dynamic icon placed on a three dimensional object, a two dimensional dynamic icon placed on a three dimensional object or any combination thereof.

9. The system of claim 1, wherein said sensor comprises a black and white camera, a color camera, an infra-red sensitive camera, a three-dimensional camera, a CCD, CMOS, ERG apparatus, Ober detection apparatus, coil eye detection apparatus, photodiode set-up or any combination thereof.

10. The system of claim 1, wherein said sensor, said controller and said dynamic icon are embedded in a mobile device.

11. A method for identifying a dynamic icon as selected by a user, the method comprising:
    displaying a dynamic icon having a dynamic property, the dynamic property changing in a unique and continuous time pattern configured to induce horizontal and/or vertical movement of the eyes of the user when looking at said dynamic icon;

acquiring the eye movement of the subject using a sensor; and extracting from the acquired eye-movement, using a controller, a temporal signal indicative of the user's horizontal and/or vertical eye movement;

analyzing the temporal signal for an indication that the user's horizontal and/or vertical eye movement is changing correspondingly to the changes in the unique and continuous time pattern of said dynamic icon, without calculating the location coordinates of the user's eye's gaze; and identifying the dynamic icon as selected by the user, if the analysis recognizes that the user's horizontal and/or vertical eye movement is changing correspondingly to the changes in the unique and continuous time pattern of said dynamic icon.

12. The method of claim 11, wherein the identifying of the dynamic icon as selected comprises forming an identification signature for the dynamic icon, and comparing the identification signature to a database comprising at least one pre-stored unique identification signatures of dynamic icons.

13. The method of claim 11, wherein said signal comprises an image and wherein the extracting of the temporal signal indicative of the user's horizontal and/or vertical eye movement comprises image processing to detect the pupil of the eye of the subject, creating a temporal eye-response signal, and analyzing said temporal eye-response signal to obtain the identity of said selected dynamic icon.

14. The system of claim 1, wherein the unique and continuous time pattern is configured so that the dynamic icon moves with respect to a first axis at a first frequency, and wherein the controller is configured to analyze said signal for an indication that the user's eye is moving at the first frequency with respect to the first axis.

15. The system of claim 14, wherein the unique and continuous time pattern is configured so that the dynamic icon also moves with respect to a second axis at a second frequency, and wherein the controller is configured to analyze said signal for an indication that the user's eye is moving at the second frequency with respect to the second axis.

16. The system of claim 15, wherein the unique and continuous time pattern is a circular pattern.

17. The system of claim 1, wherein the display unit is configured to display a first dynamic icon moving only along a first axis and a second dynamic icon moving only along a second axis, and wherein the controller is configured to (a) identify the first dynamic icon as selected by the user if the analysis detects movement along the first axis and (b) identify the second dynamic icon as selected by the user if the analysis detects movement along the second axis.

18. A system for identifying a selected icon, the system comprising:

a display unit configured to display a first icon that is moving at a first known frequency;

a sensor configured to acquire a signal indicative of eye movement of the user; and a controller configured to:
perform a frequency analysis on the acquired signal; and identify said first icon as selected by the user, if the frequency analysis detects a frequency component that matches the first known frequency, wherein the controller implements the identifying without calculating the location coordinates of the user's eye's gaze.

19. The system of claim 18, wherein the display unit is further configured to display a second icon that is moving at a second known frequency, and wherein the controller is further configured to identify said second icon as selected by the user, if the frequency analysis detects a frequency component that matches the second known frequency.

* * * * *